R. Y. BOVEE.
TRANSMISSION GEARING.
APPLICATION FILED JULY 26, 1918.
1,368,476.
Patented Feb. 15, 1921.
4 SHEETS—SHEET 4.
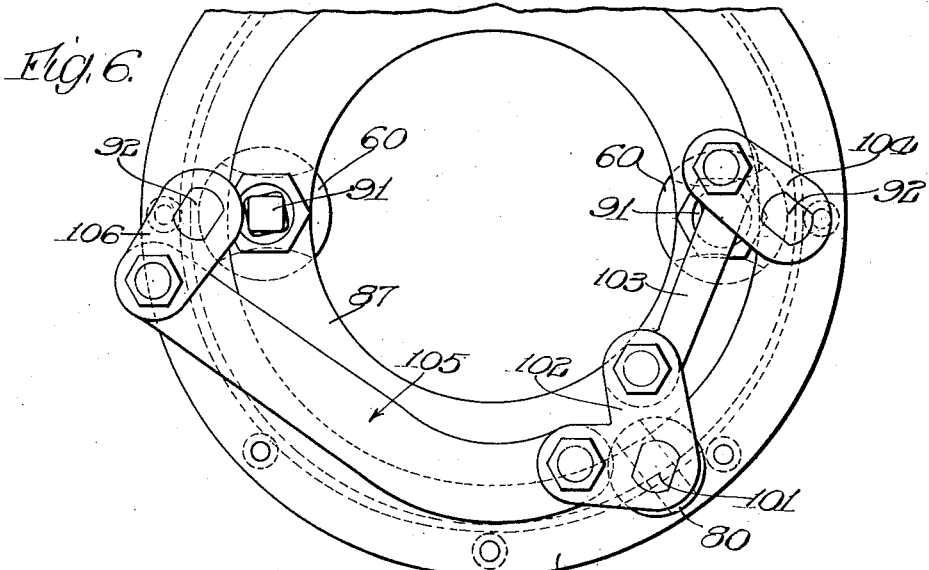
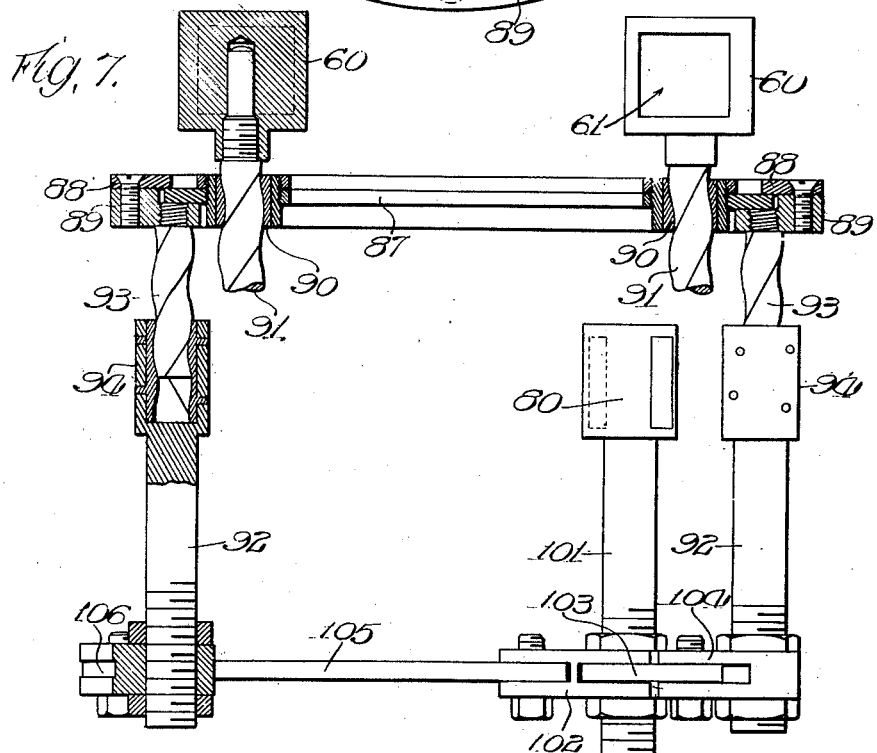
Inventor
Ransom Y. Bovee
By
Atty

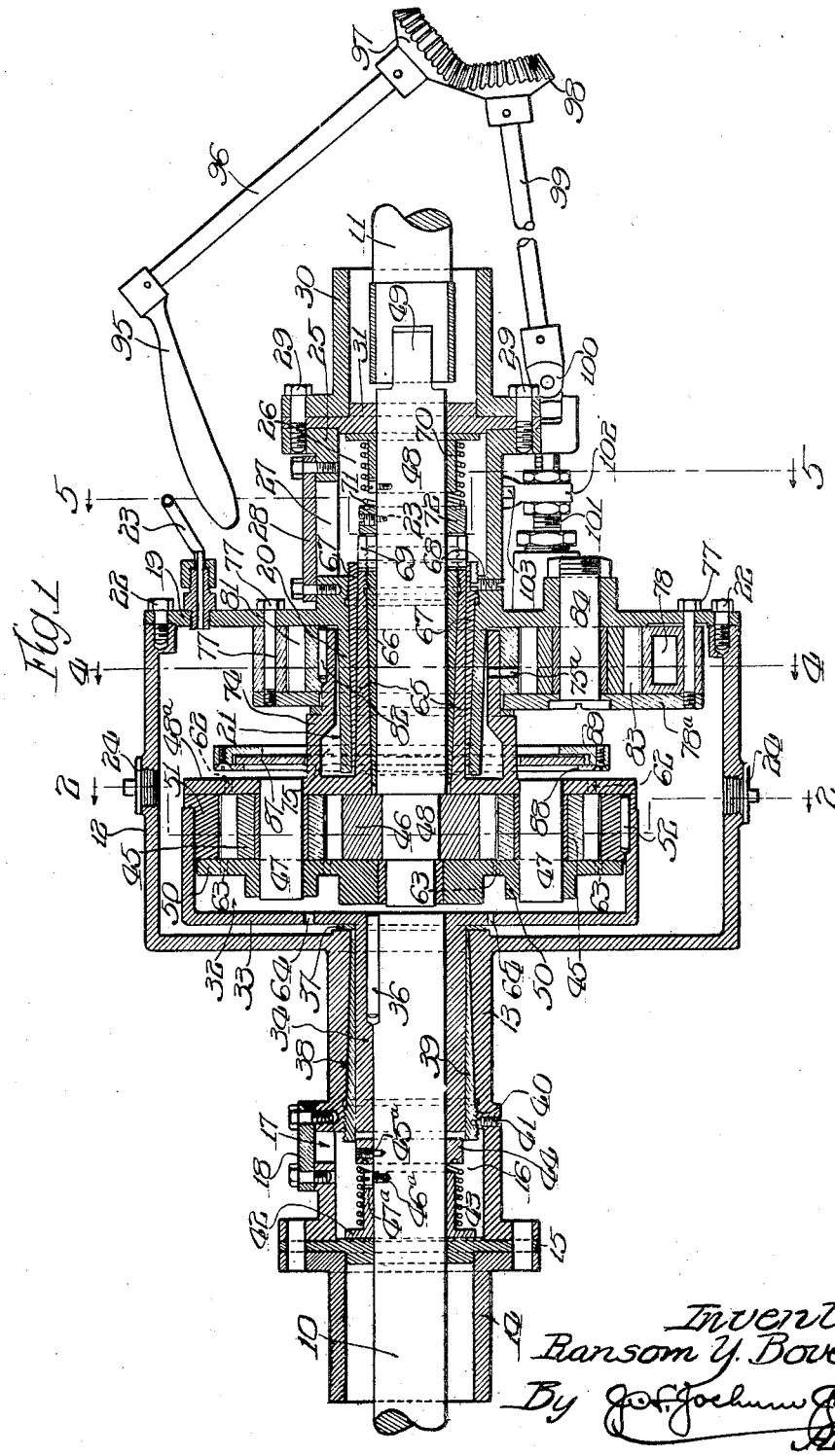

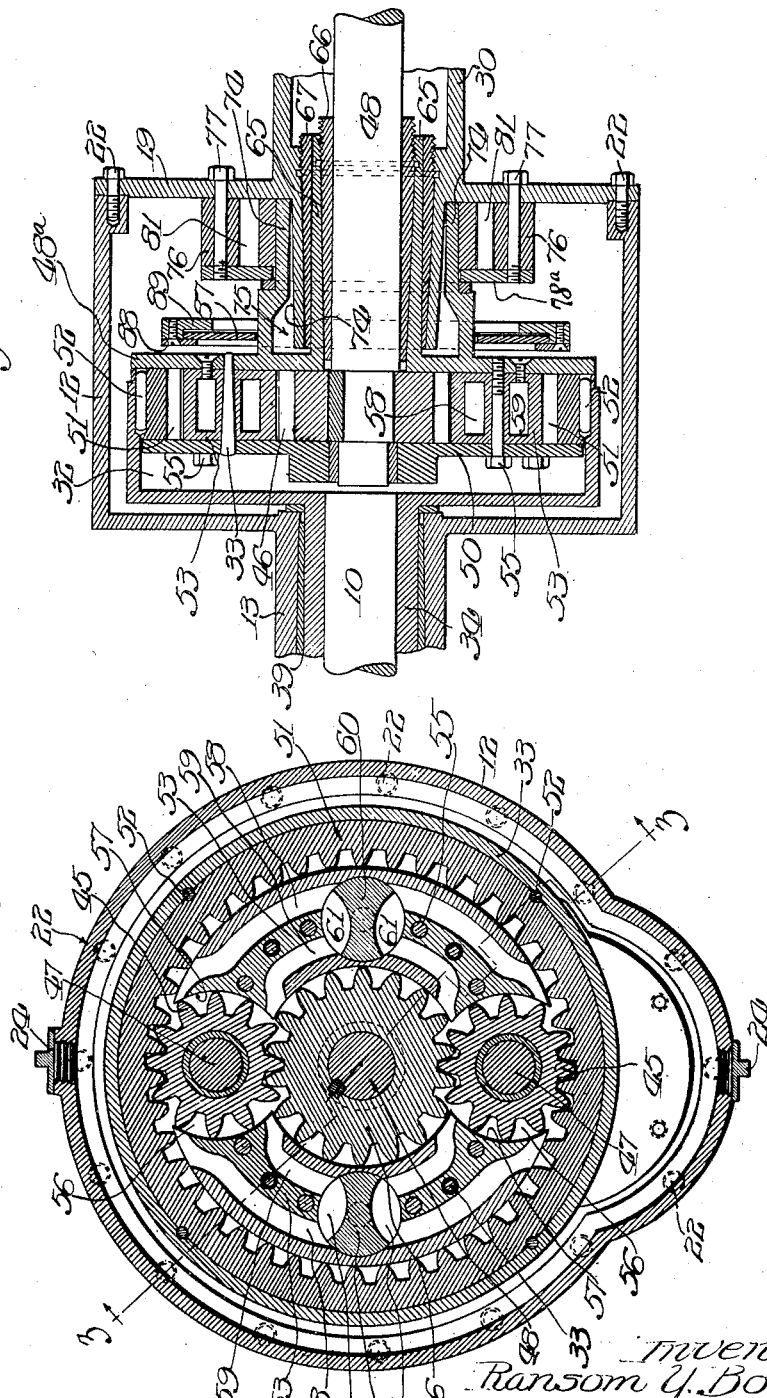

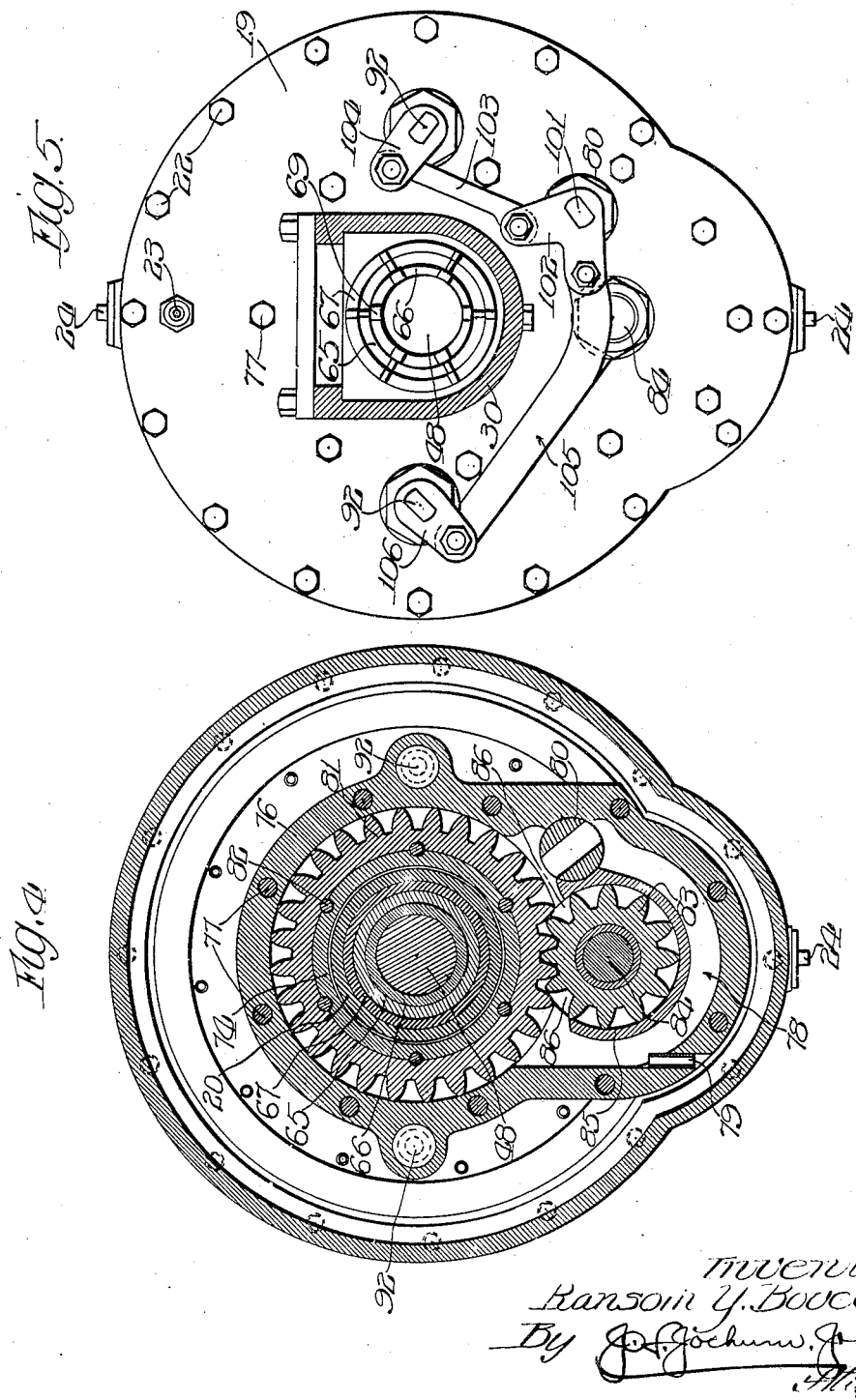

UNITED STATES PATENT OFFICE.

RANSOM Y. BOVEE, OF MAYWOOD, ILLINOIS.

TRANSMISSION-GEARING.

1,368,476.  Specification of Letters Patent.  Patented Feb. 15, 1921.

Application filed July 26, 1918. Serial No. 246,853.

*To all whom it may concern:*

Be it known that I, RANSOM Y. BOVEE, a citizen of the United States, residing at Maywood, in the county of Cook and State of Illinois, have invented certain new and useful Improvements in Transmission-Gearing, of which the following is a specification.

This invention relates in general to improvements in transmission gearing, but more specifically the invention relates to improvements in variable speed transmission gearing of the fluid controlled type, and one of the objects of the invention is to provide an improved gearing of this type by means of which a variable speed ratio or gear ratio may be obtained between a driving member and the member to be driven, without necessitating the shifting of gears, and without any fixed ratio of gear reduction.

A further object is to provide improved means whereby the driving and driven members or parts may be operatively and readily connected without the use of clutches or other locking devices.

A further object is to provide improved means whereby a variable speed may be imparted to the driven member both in a forward and in an opposite direction without the shifting of reduction mechanism, and which is adapted to also operate as a brake.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention and in which:

Figure 1 is a view partly in vertical section and partly in elevation of an improved transmission gearing of this character constructed in accordance with the principles of this invention.

Fig. 2 is a sectional view as taken on line 2—2, Fig. 1.

Fig. 3 is a sectional view as taken on line 3—3, Fig. 2.

Fig. 4 is a sectional view as taken on line 4—4, Fig. 1.

Fig. 5 is a front elevation of Fig. 1 with parts in section and with parts removed.

Fig. 6 is a view as taken on line 6—6, Fig. 7.

Fig. 7 is a top plan view of Fig. 6 with parts in elevation, parts broken away, and parts in section.

Referring more particularly to the drawings the numeral 10 designates the driven member or shaft which is connected with the traction mechanism of the vehicle, and 11 designates the driving member or engine shaft. Arranged intermediate the members 10 and 11 is a transmission gearing which is incased within a suitable housing, and this housing preferably comprises a chambered element 12 which may be of an integral structure, or, if desired, may be constructed of separate parts assembled, and the housing is provided with a tubular extension 13 into which the element 10 projects. A casing 14 is also provided for the element 10, and the tubular extension 13 and casing 14 may be connected in any suitable manner with a washer 15 therebetween. The extension 13 may be provided with an enlarged portion forming a chamber 16 having an entrance opening 17 adapted to be closed by a suitable removable closure 18.

The chambered element or housing 12 is adapted to be closed by a suitable plate or closure 19, which latter is provided with a central opening in alinement with the tubular extension 13, around which opening is arranged a bearing 20, the interior of which is preferably conical, and the bearing is also provided with a conical exterior surface 21. Suitable fastening devices 22, such as screws or the like may be provided for holding the plate 19 in position, and the housing 12 is adapted to receive and hold a supply of lubricant which may be supplied thereto in any suitable manner such as by means of a supply pipe 23, leading to a suitable source, and the housing may also be provided with openings in its periphery closed by suitable closures 24 which latter may be removed when desired.

The element 19 is also provided with a laterally projecting tubular portion 25 arranged in alinement with the bearing 20, and this portion 25 forms a chamber 26, provided with an opening 27 through its wall, and which opening is closed by a suitable closure 28. The tubular portion 25 is connected by means of suitable fastening devices 29 with a casing 30 which surrounds the element or shaft 11, and a suitable bearing 31, which may be in the form of a washer or any other suitable construction, is interposed between the end of the tubular portion 25 and the casing 30, for a purpose to be hereinafter set forth.

Arranged with the chambered element or housing 12 is a supplemental gearing chamber designated generally by the reference numeral 32, and this chamber is preferably formed by means of a cup-shaped element 33, having a tubular extension 34, which latter telescopes with the tubular extension 13 and surrounds the shaft or element 10, the element 33 being connected with the element 10 for rotation therewith in any suitable manner, such as by means of a fastening pin 36, and a washer 37 may be provided intermediate the elements 12—33 to prevent leakage of oil. The extension 33 is preferably provided with a conical interior surface 38 into which extends a bushing 39 and which bushing is interposed between the tubular extension 34 of the element 33 and the tubular extension 13, the interior surface of the bushing being cylindrical, while the exterior surface thereof is preferably conical, so that the bushing will fit within the extension 13, and is held in position preferably by means of a threaded engagement 30 between the parts, and a fastening screw 41 may be provided for holding the parts against displacement. The bushing 39 is preferably of a sectional construction so as to permit the parts to be compressed with respect to each other, and it is obvious that the bushing may be adjusted in any suitable manner. The tubular extension 34 terminates short of the washer 15, and arranged within the chamber 16 and between the elements 34 and 15 is a collar 42 which surrounds the element 10 and is held against the element 15 by means of a spring 43, one end of which abuts another collar 44, and which latter is held in position by means of a fastening device 45$^a$. A pin and slot connection 46$^a$—47$^a$ may be provided between the element 42 and the element 10. The collar 42 serves as a means for preventing any oil which may find its way into the chamber 16 from escaping between the element 15 and the element 10.

The chamber 32 is of a size considerably smaller than the chamber in the element 12, and arranged therein are opposed gears 45, intermediate of which is a gear 46, preferably of a larger diameter than the gears 45, and which meshes with both of the gears 45. The gears 45 are supported by means of suitable stub shafts 47 which are secured to the plate or element 48$^a$, which constitutes a closure for the chamber 32, suitable bushings being provided intermediate the gears 45 and their shafts 47, and the gear 46 is connected with a shaft 48 to rotate therewith, and this shaft 48 is arranged in alinement with the elements 10 and 11, so as to extend through the tubular portion 20 of the element 19 and has a detachable connection 49, with the element 11. A supporting element 50 may also be provided which coöperates with and is spaced from the element 48$^a$, and between which elements 48$^a$—50 the gears are arranged, and the element 50 serves as a bearing or support for the free ends of the shaft 47—48.

Interposed between the elements 48$^a$—50 and also between the elements 48$^a$—33 is an internal toothed gear wheel 51, which may be secured to the element 33 in any desired or suitable manner, preferably by means of fastening pins 52, so that the gear 51 will rotate with the element 33. The diameters of the gears 45—46 are such that spaced elements 53 may be arranged within the gear 51 and between said gears and the gears 45—46, the elements being spaced to permit the gears 45 to mesh with the gear 51. These elements 53 are held in position so as to rotate with the elements 33—48$^a$ in any suitable manner such as by means of fastening taper pins 54 and bolts 55. The walls of the portions of the elements 53 which are spaced from each other to form chambers 56, within which the gears 45 are located, are preferably curved as at 57 so as to stand in close proximity to the periphery of the teeth of the gears 45 to permit free rotation of the gears by the operation of the gear 46 under predetermined conditions, but when the gears 45—46 and the gear 51 are locked, under predetermined conditions, the element 53 will be bodily rotated with the gear 51.

Arranged within each of the elements 53 are spaced passages 58—59. Supported by each of the elements 53, intermediate their ends, are valves 60 which control the passages 58—59, so that when the valves are adjusted they will form a communication between the passages 58—59 through the ports 61 to permit oil to freely flow from one passage to the other, and by further adjustment will restrict the communicating opening between the passages to retard the flow of liquid. These passages 58—59 have communication with the chambers 56 within which the gears 45 are arranged, and the passages 59 also have communication with the chamber in which the gear 46 operates. The chamber 32 thus formed, and having gears 45—46 mounted therein, is adapted to be filled with oil or other liquid, and this may be accomplished in any suitable manner, such as by means of openings 62 in the element 48$^a$ and similar openings 63 in the element 50. Oil is admitted into the chamber 32 in any suitable manner, such as by means of openings 64 in the element 33.

The element 48$^a$ is provided with a tubular extension 65 which telescopes into the extension 20 of the element 19 between said extension 20 and the shaft 48 and is preferably spaced from both. The faces of the extension 65 are conical so that a conically shaped bushing 66 may be interposed between the extension 65 and the shaft 48, and a similarly conically shaped bushing 67 is interposed between the tubular extension 20 of the element 19 and the outer face of the extension 65. These bushings 66—67 are preferably of a sectional construction, and the bushing 67 may be secured against rotation by a suitable fastening device 68, while the bushing 66 is secured for rotation with the extension 65 by a suitable fastening key 69. In order to prevent the leakage of oil from the chamber 26, which might find its way into the chamber, a collar 70 similar to the collar 42 may be provided, and this collar is controlled by a spring 71 abutting a collar 72 which is secured by a suitable fastening 73, to the shaft 48.

The element 48ª is also provided with another tubular extension 74 which is concentric with the extension 65, but terminates adjacent the inner face of the element 19, the tubular extension 20 of which element 19 projects into the chamber formed between the extensions 65—74, and these extensions 65—74 are so shaped as to form an oil chamber 75 for lubricating the parts, and which may receive its supply through a suitable opening 75ª.

Disposed also within the chamber or housing formed by the elements 12 and 19 is another gear casing 76 which encompasses the tubular extension 74 of the element 48ª, and this gear casing 76 is supported and held against rotation in any suitable manner, preferably by means of fastening bolts 77 which have engagement with the rear wall 78ª of the casing and the element 19. The peripheral wall of this latter casing is cored to form a passage 78 which has communication with the interior of the chambered element or casing 12, preferably by means of a communicating passage 79 therebetween, and the passage 78 is controlled by a suitable valve 80. Arranged within this casing is a gear 81 which is connected with the tubular extension 74 of the element 48ª, in any suitable manner, such as by means of fastening devices 82, so that the gear 81 will rotate with the element 48ª, and this gear 81 meshes with a smaller gear 83 mounted upon a suitable stub shaft 84, preferably secured to the element 19. The gear 84 is arranged within a chamber 85 which has communication as at 86 with the passage 78, so that oil, flowing through the passage 78, will flow between the gears 81—83, and as the valve 80 controls this passage 78, the position of the valve will control the flow of the liquid by permitting it to flow freely through the passage or by retarding the flow thereof. The gears 45—46 are provided for the purpose of rotating the shaft or element 10 in one direction of rotation and at a variable speed by the manipulation of the valves 60 which control the flow of the liquid through the passages 58—59, and which permit the gears 45 to rotate freely with respect to the gear 51, for the purpose of producing one speed and will cause the gears 45 to be locked with respect to the gear 51 to rotate said gear 51 at another speed. The gears 81—83 are connected with the same shaft 10 in the manner already described, and permit of a reverse rotation being imparted to the shaft 10 by the manipulation of the valve 80. The valves 60 and 80 are adapted to be controlled from a single source, but are so connected that when the valves 60 are operated to control the variation of the speed of the shaft 10 in one direction, the valve 80 in its operation, will not interfere with the free flowing of the liquid through the passage 78, and likewise when it is desired to impart a reverse direction of rotation to the shaft 10, the valve 60 in its operation will not retard the flow of the liquid through the passages 58—59.

This may be accomplished in any desired or suitable manner.

A suitable and efficient means to the attainment of that end will now be described:

Supported in any desired or suitable manner, but preferably by the tubular extension 74 of the element 48 is an annular member 87 arranged between spaced members 88—89, and supported by this member 87 are bearings 90 through which the spiral or threaded stems 91 operate, and these stems 91 are connected with the valves 60 in any suitable manner, so that when the members 87—88—89 are moved bodily forwardly and backwardly, the stems 91 will move through the bearings 90, and during such movement the valves 60 will be rotated to any desired extent, according to the movement of the members 87—88—89 and also in accordance with the direction of such movement. These members are given a forward and backward movement by means of shafts 92 which are mounted in suitable bearings, preferably in the casings 76, and secured to the members, preferably to the member 89, are spiral or threaded extensions 93 similar to the extensions 91 of the valves 60. These extensions 93 telescope with suitable bearings 94 carried by the shafts 92 so that when the shafts 92 are rotated in their bearings, the bearings 94 will also be rotated, and this rotation will cause the extensions 93 to move into or out of said bearings according to the direction of rotation of the shafts 92 to effect a shifting of the elements 87—88—89.

The shafts 92 may be rotated in any suitable manner, but preferably are rotated by means of an operating handle 95 arranged in a convenient position for the operator, and is secured to a shaft 96, having a bevel gear 97 connected therewith. This gear 97 meshes with a gear 98 on a shaft 99, and which shaft 99 is connected, preferably by means of a universal joint 100 with the stem 101 of the valve 80. A bell crank lever, 102, is connected with the stem 101 of the valve 80, and this bell crank lever in turn is connected by means of a link 103 with an arm 104 on one of the shafts 92, and by means of the link 105 with an arm 106, with the other shaft 92, so that when the stem 101 is rotated, the shafts 92 will also be rotated. The bell crank lever 102 and the links 103—105 are so arranged with respect to each other that the manipulation of the valves 60 to an extent which will fully open or fully close the passages 58—59, will not cause the valve 80 to in any way affect the flow of the liquid through the passage 78. This is due to the fact that the port in the valve 80 is so arranged that during the full movement of the valves 60, it will simply change its position with respect to the passage 78, but will be in full communication with such passage during the manipulation of the valves 60. When, however, it is desired to reverse the direction of rotation of the element or shaft 10, the handle 95 is operated in the reverse direction from the direction in which it is moved to control the valves 60, and during such reverse operation of the handle 95, the valve 80 will be shifted to vary the size of the communication between its port and the passage 78. During this manipulation of the valve 80, the ports in the valves 60 will not retard the flow of the liquid through the passages 58—59, because the operation of the valve 80 to restrict its port takes place just at the time that the connections of the links 104—105 with the bell crank lever 102 are moving over the dead center, and therefore the valves 60 will not be operated.

It is thought that the operation of this device will be clearly understood from the above description, but, briefly stated, it is as follows:

Assuming the valves 60 to be in the position shown in Fig. 2 and the valves 80 to be in the position shown in Fig. 4 which is the neutral position of the parts, it will be noted that the passages 58—59 will be full open to permit of the free circulation of the liquid from the passage 58 through the passage 59 and between the gears 45—46 when the latter are rotated, and the passage 78 will be open for the free circulation of the liquid therewith and between the gears 81—83.

In order to drive the shaft or element 10 in one direction, the handle 95 is shifted in one direction to rotate the valves 60. As the valves 60 are rotated, it will be seen that the communication between the passages 58—59 is being reduced, and such a reduction of the communication between the passages will retard the flow of liquid between the passages. As the liquid is retarded, it is compressed, and, as the circulation of the liquid is affected by the rotation of the gears 45—46, operating to force the liquid from between the intermeshing teeth, it will be seen that at first the gears 45 will be rotated by the gear 46, and will cause the gears 45 to travel around the gear 51, that is, a relative rotation will be imparted to the gears 45 and 51 with respect to each other. The extent of speed of this relative movement is controlled by the position of the valves 60 to the extent that these valves retard the flow of the liquid through the passages 58—59. When it is desired to increase the speed, the size of the communicating passage is greatly reduced until the communicating passages are entirely cut off, and the passages 58—59 are closed with respect to each other. When this is effected, it will be manifest that the liquid cannot flow through the passages, and the liquid will then serve as a means for locking the gears 45 and, consequently, the gear 46 with respect to the gear 51. The latter, being connected with the shaft or element 10, will therefore be driven at a full rate of speed, and the parts will all move as a single element, the motion from the shaft 11 being then obtained in the driven element or shaft 10 by a direct drive.

When it is desired to reduce the speed of rotation of the shaft 10, the valve 60 may be adjusted until the desired reduction of speed is obtained. During this operation, the valve 80 will change its position, but its port is so arranged that it will not reduce the size of the passage 78.

When it is desired to reverse the direction of rotation of the shaft 10, the parts are brought to a neutral position, as shown in Figs. 2 and 4, and the handle 95 is then moved in the opposite direction, at which time the valve 80 will be adjusted to reduce the size of the passage 78 to cause the liquid to operate in the same manner upon the gears 81—83, imparting a reverse direction of rotation to the shaft 10. Obviously packing rings or bushings may be supplied at the points wherever they are found to be necessary or desirable.

It will also be manifest that by closing the passage 78, by means of the valve 80, the result will be that the rotation of the gears 45 relative to the rotation of the gear 51 will be stopped, with the result that the gear 51 will be rotated in the opposite direction, which tends to operate as a brake on the driven shaft.

While the preferred form of the invention has been herein shown and described, it is to be understood that various changes may be made in the details of construction and in the combination and arrangement of the several parts without departing from the spirit of this invention.

What is claimed as new is:—

1. An apparatus of the character described, embodying a driving element, a driven element, a casing for containing fluid, a planetary gearing connection between the driven and driving elements and within the casing, said gearing embodying a driving gear, an internal toothed driven gear and pinion gears interposed between the driving and driven gears, there being fluid passages in the casing intercepted by some of the said gears and through which passages the fluid is circulated by the gears, and means for controlling the passages to vary the speed ratio of the driving and driven elements.

2. An apparatus of the character described, embodying a driving element, a driven element, a casing for containing fluid, a planetary gearing connection between the driven and driving elements and within the casing, and embodying a driving gear, an internal toothed gear encompassing and spaced from the driving gear and a pinion gear intermediate the driving and driven gears, there being fluid passages in the casing intercepted by some of the said gears and through which passages the fluid is circulated by the gears, and valve mechanism coöperating with the said passages to control the flow of fluid therethrough to vary the speed ratio of the driving and driven elements.

3. An apparatus of the character described, embodying a driving element, a driven element, a casing for containing fluid, a planetary gearing connection between the driven and driving elements and within the casing, and embodying a driving gear, a driven gear and a pinion gear intermediate the driving and driven gears, there being fluid passages in the casing intercepted by some of the said gears and through which passages the fluid is circulated by the gears, and valve mechanism coöperating with the said passages to control the flow of fluid therethrough to vary the speed ratio of the driving and driven elements, said valve mechanism also adapted to entirely close said passages to cause the fluid to lock the elements of the gearing together.

4. An apparatus of the character described, embodying a driving element having a constant direction of rotation, a driven element, a casing for containing fluid, a planetary gearing connection between said driving and driven elements, said gearing being disposed within the casing and operating to circulate the fluid therein, means for controlling the circulation of the fluid imparted thereto by the said gearing, to vary the speed ratio of the driving and driven elements, and means also operating to control the flow of fluid for reversing the direction of rotation of the driven element.

5. An apparatus of the character described, embodying a driving element having a constant direction of rotation, a driven element, a casing for containing fluid, a planetary gearing connection between said driving and driven elements, said gearing being disposed within the casing and operating to circulate the fluid therein, means for controlling the circulation of the fluid imparted thereto by the said gearing, to vary the speed ratio of the driving and driven elements, and means operatively connected with the driving element for driving the said driven element in a reverse direction.

6. An apparatus of the character described, embodying a driving element having a constant direction of rotation, a driven element, a casing for containing fluid, a planetary gearing connection between said driving and driven elements, said gearing being disposed within the casing and operating to circulate the fluid therein, means for controlling the circulation of the fluid imparted thereto by the said gearing, to vary the speed ratio of the driving and driven elements, and means for driving the said driven element in a reverse direction, the last recited means embodying a casing for containing fluid, gears in the casing operating to circulate the fluid therein and means for controlling in the last recited casing the circulation of the fluid therein by the said gears.

7. An apparatus of the character described, embodying a driving element, a driven element, a casing for containing fluid, means operatively connecting the driving and driven elements and embodying gearing in the casing for actuating the driven element in one direction, said gearing operating to cause a circulation of the fluid within the casing, means for controlling the circulation of the fluid for varying the speed ratio of the driving and driven elements, and additional fluid controlled gearing between the driving and driven elements for reversing the direction of movement of the driven element.

8. An apparatus of the character described, embodying a driving element, a driven element, a casing for containing fluid, means operatively connecting the driving and driven elements and embodying gearing in the casing for actuating the driven element in one direction said gearing operating to cause a circulation of the fluid within the casing, means for controlling the circulation of the fluid for varying the speed ratio of the driving and driven elements, and additional fluid controlled gearing operatively connected with the driving element for changing the direction of movement of the driven element, said driving element having a constant direction of movement.

9. An apparatus of the character described, embodying a driving element, a driven element, an operative connection between the said elements and embodying a casing for containing fluid, gearing in the casing, said gearing operating to move the driven element in one direction and to circulate the fluid in the casing, means for controlling the circulation of the fluid to vary the speed ratio between the driving and driven elements, additional gears between the driving and driven elements, a casing for containing fluid, the last recited gears being arranged in the last recited casing to circulate the fluid therein and operating to move the driven element in the opposite direction, means for controlling the circulation of the fluid in the last recited casing to render the gearing active or inactive, and means common to the said fluid circulation controlling means for controlling them.

10. An apparatus of the character described, embodying a driving element, a driven element, an operative connection between the said elements and embodying a casing for containing fluid, gearing in the casing, said gearing operating to move the driven element in one direction and to circulate the fluid in the casing, means for controlling the circulation of the fluid to vary the speed ratio between the driving and driven elements, additional gears between the driving and driven elements, a casing for containing fluid, the last recited gears being arranged in the last recited casing to circulate the fluid therein and operating to move the driven element in the opposite direction, means for controlling the circulation of the fluid in the last recited casing to render the gearing active or inactive, and means common to the said fluid circulation controlling means for controlling them, the last recited means being adapted to maintain one of the said controlling means inactive when the other is rendered active.

11. An apparatus of the character described, embodying a driven element, a driving element, an operative connection between the driving and driven elements, said connection embodying a casing for containing a fluid, gears in the casing, said gears operating to circulate the fluid in the casing, a valve for controlling the circulation of the fluid in the casing to vary the speed ratio of the driven and driving elements, reversing mechanism intermediate the driving and driven elements and embodying a casing for containing fluid, gears in the last recited casing, said gears operating to circulate the fluid in the last recited casing, a valve for controlling the circulation of the fluid in the last recited casing to render the reversing mechanism active and inactive, and means operatively connected with the said means for controlling them at will.

12. An apparatus of the character described, embodying a driven element, a driving element, an operative connection between the driving and driven elements, said connection embodying a casing for containing a fluid, gears in the casing, said gears operating to circulate the fluid in the casing, a valve for controlling the circulation of the fluid in the casing to vary the speed ratio of the driven and driving elements, reversing mechanism intermediate the driving and driven elements and embodying a casing for containing fluid, gears in the last recited casing, said gears operating to circulate the fluid in the last recited casing, a valve for controlling the circulation of the fluid in the last recited casing to render the reversing mechanism active and inactive, and an actuator common to the valves, said actuator operating to render one of the valves inactive when another valve is rendered active.

13. An apparatus of the character described, embodying a driven element, a driving element, a casing for containing fluid, means within the casing adapted to act upon the fluid to cause a circulation of the fluid in the casing, means for controlling the circulation of the fluid by the said means whereby the speed ratio of the driving and driven elements may be varied, and means for controlling the circulation of the fluid to reverse the direction of operation of the driven element while the direction of operation of the driving element remains constant.

14. An apparatus of the character described, embodying a driven element, a driving element, a casing for containing fluid, means within the casing adapted to act upon the fluid to cause a circulation of the fluid in the casing, means for controlling the circulation of the fluid by the said means whereby the speed ratio of the driving and driven elements may be varied, the last recited means embodying a manually controlled valve, and means for also controlling the circulation of the fluid to reverse the direction of operation of the driven element while the direction of operation of the driving element remains constant.

15. An apparatus of the character described, embodying a driven element, a driving element, a casing for containing fluid, means within the casing adapted to act upon the fluid to cause a circulation of the fluid in the casing, means for controlling the circulation of the fluid by the said means whereby the speed ratio of the driving and driven elements may be varied, and additional means for reversing the direction of movement of the said driven means and embodying a casing for containing fluid, means therein operating upon the fluid to circulate it and means for controlling the last recited circulation of the fluid.

16. An apparatus of the character described, embodying a driven element, a driving element, a casing for containing fluid, means within the casing for acting upon the fluid to create a circulation thereof, means for controlling the circulation of the fluid for varying the speed ratio of the driving and driven elements, the last recited means embodying a rotary valve, an actuator, and a connection between the actuator and valve, said connection embodying a valve stem having a spiral or thread thereon, and a bearing conforming to the contour of the stem for receiving it, whereby the reciprocation of the bearing will cause the valve to be rotated.

17. An apparatus of the character described, embodying a driven element, a driving element, means operatively connecting the driving and driven elements, said means embodying a plurality of separate sets of gears, casings for containing fluid, said casings being individual to the sets of gears and in which casing the respective sets of gears are arranged to operate upon the fluid therein to create a circulation of the fluid, a valve individual to the casings for controlling the circulation of the fluid therein, and means common to the valves for operating them, one of said valves operating to control the fluid to vary the speed ratio of the driving and driven elements.

18. An apparatus of the character described, embodying a driven element, a driving element, means operatively connecting the driving and driven elements, said means embodying a plurality of separate sets of gears, casings for containing fluid, said casings being individual to the sets of gears and in which casing the respective sets of gears are arranged to operate upon the fluid therein to create a circulation to the fluid, a valve individual to the casings for controlling the circulation of the fluid therein, and means common to the valves for operating them, one of said valves operating to control the fluid to vary the speed ratio of the driving and driven elements, said sets of gears operable to drive the driven element in opposite directions.

19. Valve operating mechanism embodying a rotary valve, a valve stem, a reciprocable element, means for reciprocating the element, said stem having a spiral shaped portion and said element having a bearing conforming to the shape of the stem and in which bearing the stem operates to rotate the valve when the element is reciprocated, the said means embodying a rotatable element, a reciprocable element and a rotatable and reciprocable connection between the last two recited elements.

20. Valve operating mechanism, embodying a rotary valve, a valve stem, a reciprocable element, means for reciprocating the element, a connection between the said stem and the said element, the said connection embodying spirally shaped connected members freely operable relatively one with relation to the other, and means for imparting such relative movement embodying means for shifting the said element laterally and in a direction lengthwise of the axis of rotation of the valve.

21. Valve operating mechanism, embodying a rotary valve, a valve stem, a reciprocable element, means for reciprocating the element, a connection between the said stem and the said element, the said connection embodying spirally shaped connected members freely operable relatively one with relation to the other, and means for shifting said element in a direction lengthwise of the axis of rotation of the valve, the last recited means embodying a rotatable element and spirally connected parts between the said elements, said parts being adapted for free relative movement one with relation to the other.

22. An apparatus of the character described embodying a driving element, a driven element, a casing for containing fluid, a planetary gearing connection between the driving and driven elements and embodying a driving gear, an internal toothed gear and pinion gears intermediate the driving and driven gears, said gears operating to circulate the liquid, means for controlling the circulation of the liquid by the said gears, reverse gears operatively connected with the said internal toothed gears and operating to also circulate the fluid, means for controlling the last recited circulation of the fluid, and means for rendering active at will either set of said gears.

23. An apparatus of the character described, embodying a driving element, a driven element, a casing for containing fluid, a planetary gearing connection between the driving and driven elements and embodying a driving gear, an internal toothed gear and pinion gears intermediate the driving and driven gears, said gears operating to circulate the liquid, means for controlling the circulation of the liquid by the said gears, reverse gears operatively connected with the said internal toothed gears and operating to also circulate the fluid, means for controlling the last recited circulation of the fluid, casings individual to the respective sets of gears, and a fluid containing housing inclosing both of the said casings, both of said casings having communication with the housing and receiving fluid therefrom.

In testimony whereof I have signed my name to this specification, on this 19th day of July, A. D. 1918.

RANSOM Y. BOVEE.